US008341178B2

(12) United States Patent
Belknap et al.

(10) Patent No.: US 8,341,178 B2
(45) Date of Patent: Dec. 25, 2012

(54) SQL PERFORMANCE ANALYZER

(75) Inventors: Peter Belknap, Redwood City, CA (US);
Benoit Dageville, Foster City, CA (US);
Karl Dias, Foster City, CA (US);
Khaled Yagoub, Newark, CA (US)

(73) Assignee: Oracle International Corporation, Redwood Shores, CA (US)

(*) Notice: Subject to any disclaimer, the term of this patent is extended or adjusted under 35 U.S.C. 154(b) by 304 days.

(21) Appl. No.: 12/188,981

(22) Filed: Aug. 8, 2008

(65) Prior Publication Data

US 2009/0077017 A1    Mar. 19, 2009

Related U.S. Application Data

(60) Provisional application No. 60/973,363, filed on Sep. 18, 2007.

(51) Int. Cl.
G06F 17/30 (2006.01)
(52) U.S. Cl. ........................... 707/769; 707/964
(58) Field of Classification Search ........... 707/999.003, 707/999.005, 769, 964
See application file for complete search history.

(56) References Cited

U.S. PATENT DOCUMENTS

| | | |
|---|---|---|
| 4,769,772 A | 9/1988 | Dwyer |
| 4,803,614 A | 2/1989 | Banba et al. |
| 4,829,427 A | 5/1989 | Green |
| 4,956,774 A | 9/1990 | Shibamiya et al. |
| 5,091,852 A | 2/1992 | Tsuchida et al. |
| 5,251,131 A | 10/1993 | Masand et al. |
| 5,287,459 A | 2/1994 | Gniewek |
| 5,301,317 A | 4/1994 | Lohman et al. |
| 5,315,580 A | 5/1994 | Phaal |
| 5,325,525 A | 6/1994 | Shan et al. |
| 5,339,429 A | 8/1994 | Tanaka et al. |
| 5,379,424 A | 1/1995 | Morimoto et al. |
| 5,412,804 A | 5/1995 | Krishna |
| 5,412,806 A * | 5/1995 | Du et al. ............... 1/1 |
| 5,444,820 A | 8/1995 | Tzes et al. |
| 5,452,468 A | 9/1995 | Peterson |
| 5,459,837 A | 10/1995 | Caccavale |
| 5,469,560 A | 11/1995 | Beglin |
| 5,495,419 A | 2/1996 | Rostoker et al. |
| 5,495,606 A | 2/1996 | Borden et al. |
| 5,504,894 A | 4/1996 | Fegurson et al. |
| 5,537,588 A | 7/1996 | Engelmann et al. |
| 5,551,027 A | 8/1996 | Choy et al. |
| 5,572,640 A | 11/1996 | Schettler |
| 5,574,900 A | 11/1996 | Huang et al. |
| 5,590,319 A | 12/1996 | Cohen et al. |

(Continued)

OTHER PUBLICATIONS

Oracle® Database Performance Tuning Guide 10g Release 2 (10.2) "Using Plan Stability" pp. 18-1 to 18-10, 10gR2 released Jul. 11, 2005.

(Continued)

*Primary Examiner* — Phuong Thao Cao
(74) *Attorney, Agent, or Firm* — Hickman Palermo Truong Becker Bingham Wong LLP

(57) ABSTRACT

Techniques are provided for analyzing performance differences for a set of database query language statements on two different database systems. The performance analysis is based on quantitative measurements and estimates of the execution of the set of database query language statements on the two different database systems. This performance analysis process may be used by database administrators to predict impacts to performance due to a change in a database system.

38 Claims, 2 Drawing Sheets

U.S. PATENT DOCUMENTS

| | | | |
|---|---|---|---|
| 5,642,515 A | 6/1997 | Jones et al. | |
| 5,671,403 A | 9/1997 | Shekita et al. | |
| 5,675,791 A | 10/1997 | Bhide et al. | |
| 5,680,547 A | 10/1997 | Chang | |
| 5,694,591 A | 12/1997 | Du et al. | |
| 5,710,915 A | 1/1998 | McElhiney | |
| 5,764,912 A | 6/1998 | Rosborough | |
| 5,765,150 A | 6/1998 | Burrows | |
| 5,787,251 A | 7/1998 | Hamilton et al. | |
| 5,794,227 A | 8/1998 | Brown | |
| 5,797,136 A | 8/1998 | Boyer et al. | |
| 5,822,748 A | 10/1998 | Cohen et al. | |
| 5,852,820 A | 12/1998 | Burrows | |
| 5,857,180 A | 1/1999 | Hallmark et al. | |
| 5,860,069 A * | 1/1999 | Wright | 1/1 |
| 5,875,445 A | 2/1999 | Antonshenkov | |
| 5,918,225 A | 6/1999 | White et al. | |
| 6,003,022 A * | 12/1999 | Eberhard et al. | 1/1 |
| 6,009,265 A | 12/1999 | Huang et al. | |
| 6,026,390 A | 2/2000 | Ross et al. | |
| 6,026,391 A * | 2/2000 | Osborn et al. | 1/1 |
| 6,026,394 A | 2/2000 | Tsuchida et al. | |
| 6,061,676 A | 5/2000 | Srivastava et al. | |
| 6,205,451 B1 | 3/2001 | Norcott et al. | |
| 6,289,335 B1 | 9/2001 | Downing et al. | |
| 6,298,342 B1 | 10/2001 | Graefe et al. | |
| 6,334,128 B1 | 12/2001 | Norcott et al. | |
| 6,339,768 B1 | 1/2002 | Leung et al. | |
| 6,353,826 B1 * | 3/2002 | Seputis | 1/1 |
| 6,356,889 B1 | 3/2002 | Lohman et al. | |
| 6,356,891 B1 | 3/2002 | Agrawal et al. | |
| 6,370,524 B1 | 4/2002 | Witkowski | |
| 6,430,550 B1 | 8/2002 | Leo et al. | |
| 6,438,558 B1 | 8/2002 | Stegelmann | |
| 6,438,562 B1 | 8/2002 | Gupta et al. | |
| 6,526,526 B1 | 2/2003 | Dong et al. | |
| 6,529,896 B1 | 3/2003 | Leung et al. | |
| 6,529,901 B1 | 3/2003 | Chaudhuri et al. | |
| 6,615,222 B2 * | 9/2003 | Hornibrook et al. | 1/1 |
| 6,684,203 B1 | 1/2004 | Waddington et al. | |
| 6,694,306 B1 | 2/2004 | Nishizawa et al. | |
| 6,807,546 B2 | 10/2004 | Young-Lai | |
| 6,901,405 B1 | 5/2005 | McCrady et al. | |
| 6,934,699 B1 | 8/2005 | Haas et al. | |
| 6,941,360 B1 | 9/2005 | Srivastava et al. | |
| 6,954,776 B1 | 10/2005 | Cruanes et al. | |
| 6,961,729 B1 | 11/2005 | Toohey et al. | |
| 6,980,988 B1 | 12/2005 | Demers et al. | |
| 6,990,503 B1 | 1/2006 | Luo et al. | |
| 7,007,007 B2 * | 2/2006 | Slutz | 707/809 |
| 7,089,225 B2 | 8/2006 | Li et al. | |
| 7,155,428 B1 * | 12/2006 | Brown et al. | 1/1 |
| 7,185,000 B1 * | 2/2007 | Brown et al. | 707/718 |
| 7,234,112 B1 | 6/2007 | Brown et al. | |
| 7,246,108 B2 | 7/2007 | Ahmed | |
| 7,305,410 B2 | 12/2007 | Skopec et al. | |
| 7,363,289 B2 | 4/2008 | Chaudhuri et al. | |
| 7,383,247 B2 | 6/2008 | Li et al. | |
| 7,406,477 B2 | 7/2008 | Farrar et al. | |
| 7,499,907 B2 * | 3/2009 | Brown et al. | 1/1 |
| 7,747,606 B2 | 6/2010 | Dageville et al. | |
| 2001/0047372 A1 | 11/2001 | Gorelik et al. | |
| 2002/0038313 A1 | 3/2002 | Klein et al. | |
| 2002/0099521 A1 * | 7/2002 | Yang et al. | 702/186 |
| 2002/0138376 A1 | 9/2002 | Hinkle | |
| 2002/0188600 A1 | 12/2002 | Lindsay et al. | |
| 2003/0033291 A1 * | 2/2003 | Harris | 707/3 |
| 2003/0065644 A1 | 4/2003 | Horman et al. | |
| 2003/0093408 A1 * | 5/2003 | Brown et al. | 707/2 |
| 2003/0115212 A1 * | 6/2003 | Hornibrook et al. | 707/103 R |
| 2003/0135480 A1 | 7/2003 | Van Arsdale et al. | |
| 2003/0159136 A1 | 8/2003 | Huang et al. | |
| 2003/0182276 A1 * | 9/2003 | Bossman et al. | 707/3 |
| 2003/0212647 A1 * | 11/2003 | Bangel et al. | 707/1 |
| 2003/0212668 A1 | 11/2003 | Hinshaw et al. | |
| 2003/0229639 A1 * | 12/2003 | Carlson et al. | 707/100 |
| 2004/0015600 A1 * | 1/2004 | Tiwary et al. | 709/234 |
| 2004/0205062 A1 * | 10/2004 | Brown et al. | 707/3 |
| 2004/0220911 A1 | 11/2004 | Zuzarte et al. | |
| 2004/0244031 A1 * | 12/2004 | Martinez | 725/25 |
| 2005/0028134 A1 | 2/2005 | Zane et al. | |
| 2005/0055382 A1 | 3/2005 | Ferrat et al. | |
| 2005/0120000 A1 * | 6/2005 | Ziauddin et al. | 707/3 |
| 2005/0125393 A1 * | 6/2005 | Yagoub et al. | 707/3 |
| 2005/0125427 A1 * | 6/2005 | Dageville et al. | 707/100 |
| 2005/0125452 A1 * | 6/2005 | Ziauddin et al. | 707/104.1 |
| 2005/0165741 A1 * | 7/2005 | Gordon | 707/3 |
| 2005/0177557 A1 * | 8/2005 | Ziauddin et al. | 707/3 |
| 2005/0177971 A1 | 8/2005 | Porco | |
| 2005/0187917 A1 * | 8/2005 | Lawande et al. | 707/3 |
| 2005/0187971 A1 | 8/2005 | Hassan et al. | |
| 2005/0198013 A1 | 9/2005 | Cunningham et al. | |
| 2005/0203933 A1 * | 9/2005 | Chaudhuri et al. | 707/101 |
| 2005/0203940 A1 | 9/2005 | Farrar et al. | |
| 2005/0234965 A1 | 10/2005 | Rozenshtein et al. | |
| 2005/0262060 A1 * | 11/2005 | Rohwedder et al. | 707/3 |
| 2005/0278577 A1 | 12/2005 | Doong et al. | |
| 2005/0283471 A1 | 12/2005 | Ahmed | |
| 2006/0026115 A1 | 2/2006 | Ahmed | |
| 2006/0026133 A1 | 2/2006 | Ahmed | |
| 2006/0031200 A1 * | 2/2006 | Santosuosso | 707/3 |
| 2006/0041537 A1 | 2/2006 | Ahmed | |
| 2006/0129542 A1 * | 6/2006 | Hinshaw et al. | 707/3 |
| 2006/0195416 A1 * | 8/2006 | Ewen et al. | 707/2 |
| 2006/0212428 A1 * | 9/2006 | Nelson | 707/3 |
| 2006/0218123 A1 | 9/2006 | Chowdhuri et al. | |
| 2007/0038595 A1 | 2/2007 | Ghosh et al. | |
| 2007/0061379 A1 * | 3/2007 | Wong et al. | 707/201 |
| 2007/0078825 A1 * | 4/2007 | Bornhoevd et al. | 707/3 |
| 2007/0083500 A1 * | 4/2007 | Zibitsker | 707/3 |
| 2008/0010240 A1 * | 1/2008 | Zait | 707/2 |
| 2008/0040196 A1 * | 2/2008 | Coon et al. | 705/10 |
| 2008/0052271 A1 * | 2/2008 | Lam | 707/3 |
| 2008/0077348 A1 | 3/2008 | Hildebrand et al. | |
| 2008/0098003 A1 * | 4/2008 | Dias et al. | 707/10 |
| 2008/0114718 A1 * | 5/2008 | Anderson et al. | 707/2 |
| 2008/0168058 A1 * | 7/2008 | Gordon | 707/5 |
| 2008/0178079 A1 * | 7/2008 | Chen et al. | 715/700 |
| 2008/0215536 A1 * | 9/2008 | Day et al. | 707/2 |
| 2008/0228710 A1 | 9/2008 | Muras | |
| 2008/0235183 A1 * | 9/2008 | Draese et al. | 707/2 |
| 2009/0006445 A1 * | 1/2009 | Shemenzon et al. | 707/102 |
| 2009/0018992 A1 | 1/2009 | Zuzarte et al. | |
| 2009/0037923 A1 * | 2/2009 | Smith et al. | 718/104 |
| 2009/0077016 A1 | 3/2009 | Belknap et al. | |
| 2009/0100004 A1 | 4/2009 | Andrei et al. | |

OTHER PUBLICATIONS

Gopalkrishnand, Vivikanand, et al. "Issues of Object-Relational View Design in Data Warehousing Environment," IEEE 1998, 0780347781, pp. 2732-2737.

Kung, Chenho, "Object Subclass Hierarchy in SQL: A Simple Approach," Communications of the AC, Jul. 1990, vol. 33, No. 7, pp. 117-125.

Bello, Randall G. et al. "Materialized Views in Oracle," VLDB '98, Proceedings of 24th International Conference on Very Large Data Bases, Aug. 24-27, 1998, New York City, New York, USA, pp. 659-664.

Najjar, Faiza et al. "Cardinality estimation of distributed join queries," Sep. 1-3, 1999; Database and Expert Systems Applications, 1999, Proceedings, Tenth International Workshop on, pp. 66-70.

Moro, Gianluca et al. "Incremental maintenance of multi-source views," Database Conference, 2001, ADC 2001, Proceedings, 12th Australasian, Jan. 2001, pp. 13-20.

Ahmed, Rafi, et al., "Cost-Based Query Transformation in Oracle," Copyright 2006 VLDB, ACM 1595933859, pp. 1026-1036.

Deutsch, Alin et al., "Minimization and Group—By Detection for Nested XQueries", University of California, San Diego, 2003, 15 pages.

Dehaan, David, "A Rewriting Algorithm for Multi-Block Aggregation Queries and Views using Prerequisites and Compensations", University of Waterloo, Canada, Technical Report CS-2004-25, May 3, 2004, 39 pages.

Chaudhuri, Surajit, "An Overview of Query Optimization in Relational Systems", Microsoft Research, 1998, 10 pages.

Muralikrishna, M., "Improved Unnesting Algorithms for Join Aggregate SQL Queries", VLDB Conference, Canada, 1992, 12 pages.

Hayu, John, "Analytic SQL Features in Oracle9i", An Oracle Technical White Paper, Dec. 2001, 32 pages.

U.S. Appl. No. 12/188,662, filed Aug. 8, 2008, Office Action, Feb. 24, 2011.

U.S. Appl. No. 12/188,683, filed Aug. 8, 2008, Office Action, Mar. 30, 2011.

U.S. Appl. No. 12/188,662, filed Aug. 8, 2008, Office Action, Jul. 13, 2011.

U.S. Appl. No. 12/188,975, filed Aug. 8, 2008, Non Final Office Action, Dec. 21, 2011.

U.S. Appl. No. 12/188,683, filed Aug. 8, 2008, Final Office Action, Sep. 27, 2011.

U.S. Appl. No. 12/188,678, filed Aug. 8, 2008, Final Office Action, Oct. 13, 2011.

U.S. Appl. No. 12/188,673, filed Aug. 8, 2008, Final Office Action, Dec. 22, 2011.

U.S. Appl. No. 12/188,673, filed Aug. 8, 2008, Advisory Action, Mar. 23, 2011.

U.S. Appl. No. 12/188,975, filed Aug. 8, 2008, Final Office Action, May 14, 2012.

* cited by examiner

SQL PERFORMANCE ANALYZER

CROSS-REFERENCE TO RELATED APPLICATIONS; BENEFIT CLAIM

This application claims benefit of Provisional Appln. 60/973,363, filed Sep. 18, 2007, the entire contents of which is hereby incorporated by reference as if fully set forth herein, under 35 U.S.C. §119(e).

FIELD OF THE INVENTION

The present invention relates to the field of electronic database management.

BACKGROUND

One of the most important tasks performed by database administrators (DBAs) is to provide stable performance in the presence of changes to the database system. Changes to a database system includes, among other things, database system upgrades, parameter modifications, index creations, etc. When these changes are made to the database system, DBAs must ensure that database system performance and end-user satisfaction will not regress (i.e., become worse than before the changes were made). This task is, however, a challenging and time-consuming one because of the difficulty in predicting, in advance, the impact of a change on the performance of a production database system before actually implementing the change on the production database system.

Therefore, there is a need for a process for measuring the impact to the performance of a database system on which changes have been made. This process will enable DBAs to foresee where performance may improve or deteriorate and allow the DBAs to take corrective actions to fix the regressions before implementing the changes to the production database system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
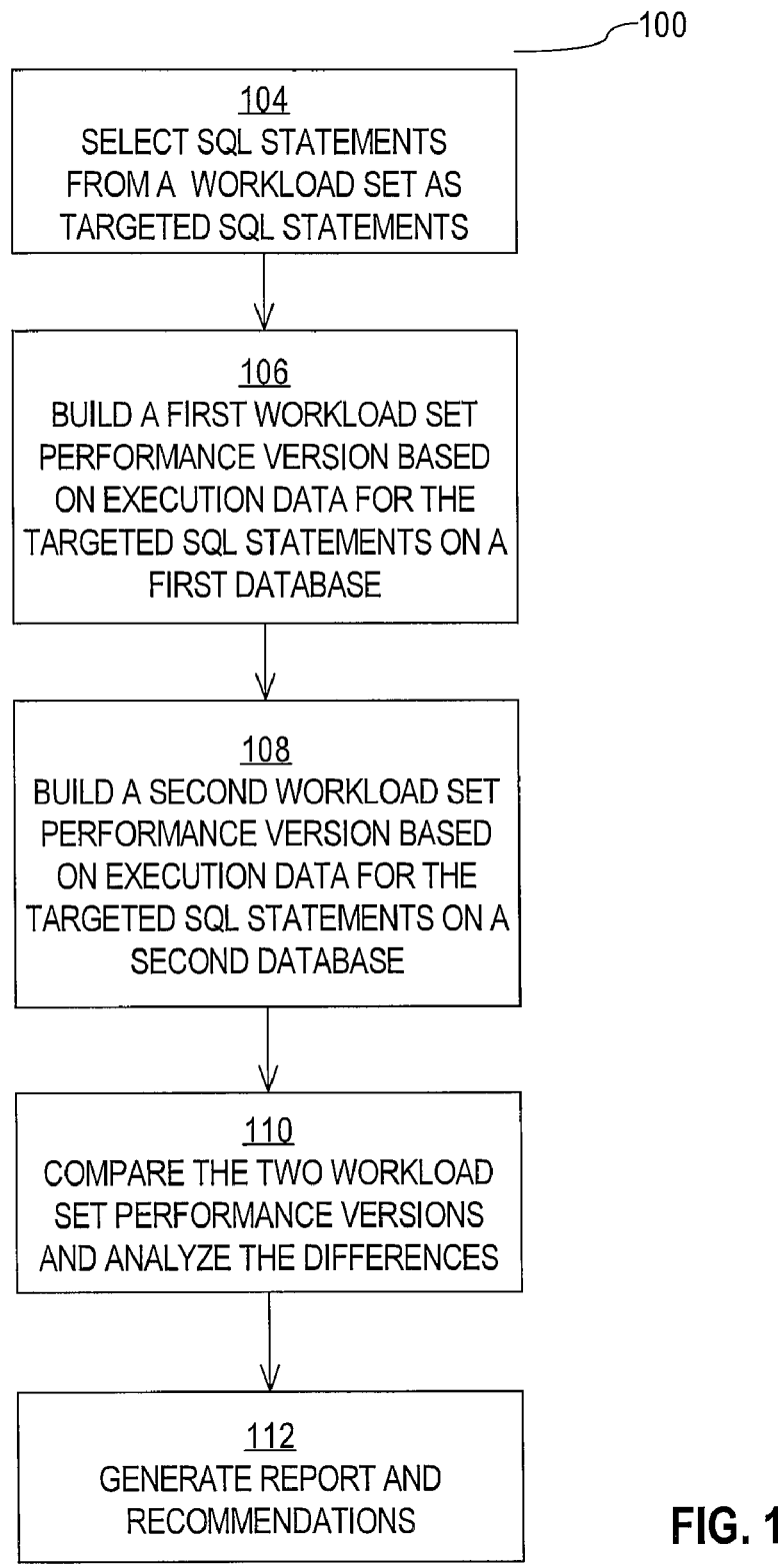
FIG. 1 is a flow diagram that illustrates steps in a process for testing and measuring the performance of a database system on which changes have been made.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

An SQL Performance Analyzer (SPA) provides users of a database system (e.g., DBAs) with a tool for measuring comparing performance of a workload set across different database systems. A workload set is a collection of database query language statements and performance information associated with the database query language statements. This comparison is based on quantitative measurements of the performance of the workload set on the different database systems, and the different database systems may be two database systems where the second database system is the first database system with certain changes (e.g., a patch update, new index creations, database system upgrade, etc.) implemented on it. Therefore, SPA enables DBAs to forecast and analyze how changes to a database system would impact the performance of a workload set. Furthermore, SPA enables DBAs to identify potential problems that may occur and generates recommendations to the DBAs for avoiding performance degradation. The DBAs may then tune the database system and circumvent predicted regressions before implementing the changes in production.

In one embodiment, the database query language statements are SQL statements. Although the embodiments of the invention are described herein using the term "SQL", the invention is not limited to just this particular database query language, and may be used in conjunction with other database query languages and constructs.

According to one embodiment, SPA performs the following process to provide DBAs with comparative performance information across different database systems:

(1) select SQL statements, from a workload set, as targeted SQL statements for performance analysis;

(2) execute the targeted SQL statements on a first database system and gather performance data about the execution;

(3) execute the targeted SQL statements on a second database system and gather performance data about the execution; and (4) compare and analyze the performance data gathered from execution of the targeted SQL statements on the first database system with the performance data gathered from execution of the targeted SQL statements on the second database system.

A DBA may utilize SPA to forecast how a change or changes to a database system will impact performance by directing SPA to use an unchanged database system as the first database system and by directing SPA to use a database system with the changes incorporated as the second database system.

According to one embodiment, the workload set analyzed by SPA is captured from a production database system such that the SQL statements in the workload set are SQL statements that have actually been executed on the production database system. Data related to the SQL statements in the workload set is also captured into the workload set, including: execution statistics such as the number of buffer gets and elapsed times of the SQL statements; data access statistics such as the number of rows fetched by the SQL statements; and data related to execution context, such as bind values and optimizer parameter values for the SQL statements.

According to one embodiment, SPA may generate a report summarizing and detailing the measurements and results of the comparative analysis, and provide this report to the DBA.

According to another embodiment, SPA may be used repeatedly and iteratively to compare different database systems or different versions of a database system as the DBA makes further changes to the database systems.

According to another embodiment, SPA may execute SQL statements on a remote database system for purposes of measurement and comparative analysis of performance.

Providing Workload Sets to SPA

The targeted SQL statements that are executed in SPA are selected from a workload set. According to one embodiment, a workload set is stored as an SQL Tuning Set. SQL Tuning Sets are described in "SQL TUNING SETS", application Ser. No. 10/936,449, filed on Sep. 7, 2004, the entire contents of which are hereby incorporated by reference. An SQL Tuning Set is a persistent database object that stores one or more database query language statements and associated information for each statement. The associated information may include: execution statistics such as the number of buffer gets and elapsed times of the SQL statements; data access statistics such as the number of rows fetched by the SQL statements; and data related to execution context, such as bind values and optimizer parameter values for the SQL statements. Additionally, the associated information may also include information that is relevant for comparative SQL analysis, such as the number of rows that was returned by the SQL statement.

According to one embodiment, a workload set is incrementally captured from SQL statements that are executed on a production database system during a particular period of time (e.g., one hour, one day, one week, etc.). This way, a large percentage of SQL statements that have actually been executed on the production database system is captured, thereby enabling SPA execution and analysis to be performed on a realistic set of SQL statements. SQL statements that have been executed during different periods of time may also be captured into a single workload set. For example, SQL statements that have been executed on a production database system during the business hours of Monday through Friday of a particular week may be captured into the same workload set. In other words, the SQL statements that are captured into a single workload set need not have been executed contiguously in time. In addition, filtering may be performed during the capturing process so that only SQL statements that meet specified filter conditions are captured. For example, filter conditions may specify that SQL statements that are associated with a first application are to be captured into a first workload set while SQL statements that are associated with a second application are to be captured into a second workload set. The filter conditions may be specified by DBAs. Finally, two or more workload sets may be combined into a single combined workload set, where SPA execution and analysis is performed on the combined workload set.

According to another embodiment, a workload set is built from a set of diagnostic traces that are captured from a production database system.

According to yet another embodiment, a workload set is manually built by a DBA. With DBA-built workload sets, DBAs can specifically control and input the workload set that will be executed and analyzed by SPA.

Any workload set, including workload sets captured or built according to the approaches just described, may be provided to SPA for execution and analysis.

Selecting SQL Statements from a Workload Set for Analysis

In FIG. 1, in step 104 of flowchart 100, SQL statements are selected from a workload set as targeted SQL statements that will be executed and analyzed by SPA. According to one embodiment, the targeted SQL statements that are selected include all the SQL statements in the workload set provided to SPA.

According to another embodiment, only a subset of the SQL statements in the workload set is selected as targeted SQL statements. For example, the targeted SQL statements may only include SQL statements that originate from a particular application. In another example, the targeted SQL statements only include SQL statements that originate from particular URL addresses. By providing the ability to select which SQL statements are targeted for execution and analysis, DBAs who use SPA are able to compare the performance of two versions of a database system for specific types of SQL statements.

Executing SQL Statements on a First Database System

In step 106 of FIG. 1, SPA builds a first "SQL workload performance version" by executing the targeted SQL statements on the first database system. An SQL workload performance version includes, for each targeted SQL statement, an execution plan and associated performance data. The associated performance data includes execution statistics such as: total time spent in execution, CPU time, I/O time, number of I/Os, and frequency of execution. In addition, SPA may also collect additional information from the execution that may be of interest to DBAs, such as the number of rows returned by an SQL statement and encountered errors. This additional information may also be stored as associated performance data in the SQL workload performance version.

In one embodiment, to build an SQL workload performance version, SPA executes the targeted SQL statements only to an extent necessary for gathering performance data for the targeted SQL statements. In other words, SPA may not execute the targeted SQL statements to the same extent that the targeted SQL statements are normally executed on a production database system. For example, SPA may execute the targeted SQL statements in isolation from other SQL statements and without respect to the initial order of the targeted SQL statements as issued by the originating application or to the concurrency between the SQL statements. Also, SPA may execute each targeted SQL statement as many times as necessary to collect a meaningful and reliable set of performance data.

In addition, SPA may execute only the targeted SQL statements that are queries and only the query portions of targeted SQL statements that are Data Manipulation Language (DML) statements. Executing only queries and query portions has the benefit of avoiding impact or side effects on the underlying database system on which SPA executes the targeted SQL statements. Avoiding any impact on the underlying database system is especially important when SPA is being run on a production database system. Additionally, since executing only queries and query portions of DML statements does not change the data in the underlying database system (e.g., the first database system) on which SPA executes the targeted SQL statements, it is not necessary that the targeted SQL statements be executed in any particular order.

Also, even when SPA does not fully execute the targeted statements, SPA may still collect information regarding encountered errors for later analysis.

According to one embodiment, SPA allows a DBA to set a time limit on the total amount of time dedicated to executing the targeted SQL statements. When this time limit is reached, SPA terminates execution of the targeted SQL statements, regardless of whether all the targeted SQL statements have been executed. SPA also allows a DBA to set a time limit on the amount of time dedicated to executing a single targeted SQL statement. When this time limit is reached, SPA terminates execution of the currently executing targeted SQL statements, regardless of whether the currently executing targeted SQL statement has finished executing, and initiates execution of the next targeted SQL statement. In this manner, DBAs may control SPA to ensure that the entire execution and analysis process be completed within a reasonable amount of time and that the process is not monopolized by a few computationally expensive SQL statements.

According to one embodiment, SPA may be terminated by a DBA while in the midst of executing targeted SQL statements. Upon such termination, SPA may retain the performance data gathered from execution of previously executed targeted SQL statements for comparison analysis. In this manner, a DBA may choose to terminate a SPA execution if he determines that enough targeted SQL statements have been executed for meaningful analysis without losing valuable performance data for the targeted SQL statements that have been previously executed by SPA.

According to one embodiment, the targeted SQL statements that have been selected for analysis may be executed by SPA in an order specified by the DBA. For example, the DBA may specify that the targeted SQL statements be ranked in order of total elapsed time (total elapsed time is an execution statistic that is contained in the workload set from which targeted SQL statements are selected) and executed in an order corresponding to that ranking. In this manner, a DBA may control the execution of targeted SQL statements so that the SQL statements that are of most interest to the DBA (e.g., SQL statements associated with the longest total elapsed times) are executed first, increasing the likelihood that the targeted SQL statements of the most interest to the DBA are executed before any time limit set for SPA execution is reached.

According to one embodiment, SPA generates execution plans for the targeted SQL statements but does not fully execute the targeted SQL statements. In this embodiment, cost estimates are generated according to the execution plans and are used to build the workload set performance version. Building a workload set performance version from cost estimates of execution plans is less time-consuming than building the workload set performance version from actual execution statistics. In addition, if the first database system contains a database whose data does not resemble the data in the database in the production database system, then in some cases the cost estimates derived from the execution plans may more accurately assess the performance of the targeted SQL statements than actual execution of the targeted SQL statements on the first database system.

According to one embodiment, the first database system is a test database system that is a copy of the production database system that is separate and apart from the production database system. In this manner, SPA may execute the targeted SQL statements without affecting the production database system at all. Since the targeted SQL statements are selected from a workload set that captured actual SQL statements executed on the production database system, performance data gathered on the targeted SQL statements will accurately predicate the performance of the targeted SQL statements on the actual production database system.

According to one embodiment, the first database system is the production database system such that the SQL statements are executed by SPA directly on the production database system itself.

According to one embodiment, the data contained in the database of the first database system does not have all of the data contained in the database of the production database system. SPA may execute the targeted SQL statements on database systems that are less than full replicas of the production database system.

According to another embodiment, SPA may generate a report that is based on the associated performance data in the first workload set performance version and provide this report to the DBA. This report may be viewed by a DBA to assess the performance of the targeted SQL statements on the first database system. For example, the DBA may examine this report to assess whether the performance of the targeted SQL statements on the first database system is as expected. In this manner, DBAs can also optionally utilize SPA to assess the performance of targeted SQL statements on a single database system, without SPA performing the additional steps of executing the targeted SQL statements on a second database system and performing a comparative analysis of the performance data from the two database systems.

Executing SQL Statements on a Second Database System

In order to test the impact of a potential change on the SQL performance of a database system, a minimum of two versions of workload set performance must be built. In step 108 in FIG. 1, SPA builds a second "workload set performance version" by executing the targeted SQL statements on a second database system. A DBA may make changes to the first database system and utilize the changed database system as the second database system on which SPA executes the targeted SQL statements in order to gather performance data to build the second workload set performance version. SPA may execute the targeted SQL statements on any database system that it is directed to by the DBA or any user of SPA. This way, a DBA may use SPA to analyze and compare the performance of a database system before and after changes are made to the database system in the SPA environment, before implementing the changes to the production database system.

The approaches described above with regard to SPA's execution of the targeted SQL statements on the first database system are equally applicable to SPA's execution of the targeted SQL statements on the second database system.

The second workload set performance version is stored separate from the first workload set performance version.

Comparing Performance Across the First and Second Database Systems

Once two SQL performance workload set versions have been built, SPA begins the next step (step 110) of performance analysis by comparing the performance data from the first version with the corresponding performance data from the second version. During this performance analysis, SPA computes the impact of the differences between the second version and the first version on (1) the overall performance of the workload set; and (2) each targeted SQL statement.

The impact numbers computed by SPA represent a measurement of the magnitude of change on SQL performance. Negative values indicate regressions and positive values highlight improvements. SPA calculates the change impact based on the rate of resource consumption by the targeted SQL statements in the two workload set performance versions and the weight of each targeted SQL statement in the set of targeted SQL statements. Weight may be determined by the number of times the SQL was executed in the workload set. This information, which is contained in the workload set from which the targeted SQL statements are selected, is important to consider in calculating the impact of a change. Incorporating information such as the execution frequency of a targeted SQL statement allows SPA to correctly and fairly assess both SQL statements that have short execution times but are frequently executed and SQL statements that have long execution times but are executed only a few times. For example, an increase in execution time from 0.1 second to 0.15 second for an SQL statement that is executed very frequently will most likely have a greater negative impact on the overall performance of the database system than an increase in execution time from 2 seconds to 4 second for an SQL statement that is executed very rarely.

Resource consumption is measured based on the execution statistics (e.g., elapsed time, CPU time, buffer gets, disk reads, etc.) that are contained in the performance data of the SQL workload performance versions. By default, SPA uses elapsed time as the metric for performance comparison. SPA may also be configured to use other statistics, such as CPU time, buffer gets, and execution plan cost, or any combination of statistics. SPA may also compare the structural changes between the execution plans contained in the two SQL workload performance versions, particularly for those statements that exhibit performance degradations, in order to find and explain the reasons for the regressions.

Additionally, SPA may be configured with a set of rules for determining whether to label a change as a significant improvement or regression. For example, the set of rules direct SPA to label a change as a significant improvement or regression only if the change impacts the performance of a targeted SQL statement by at least a specified amount, or if the change impacts the performance of the set of targeted SQL statements by another specified amount. The labeling of significant improvement or regression may be included in reports generated by SPA.

Generating Reports and Recommendations

According to one embodiment, the performance analysis and comparison results are communicated to users (e.g., DBAs) through the SPA report. In addition to a summary and details about the SQL workload set content and performance information, the report also clearly identifies and isolates the subset of SQL statements which are going to cause performance problems when the planned changes are made. According to one embodiment, the SPA report is provided to a user through a graphical user interface (GUI). According to another embodiment, the report is provided to the user as text on a command line.

According to one embodiment, the SPA report indicates: what the overall impact is to the database system if the database system were to change from the first database system to the second database system; the number of SQL statements whose performance have improved; the number of SQL statements whose performance have regressed; the number of SQL statements whose performance has remained the same; and the number of SQL statements whose execution plan has changed. Furthermore, the SPA report may indicate which SQL statements have improved in performance, which SQL statements have regressed in performance, and which SQL statements have experienced a change in execution plan. The SPA report may also contain details about errors encountered during the analysis and unexpected changes to the data during the execution. If the SPA report is provided as a GUI, users may interact with the GUI to get further details on a specific topic that is reported. For example, a user may click on a link associated with the number of SQL statements whose performance have regressed to view a list of the specific SQL statements that have regressed and view the associated execution plans and runtime statistics with and without the tested changes.

According to another embodiment, SPA may make two types of recommendations for SQL statements that have regressed: (1) run SQL Tuning Advisor to tune any SQL statements that would experience degradation in performance; and (2) create plan baselines for the regressed SQL statements using plans from the pre-change version of the workload set performance. The SQL Tuning Advisor is described in "AUTOMATIC SQL TUNING ADVISOR", application Ser. No. 10/936,778, filed Sep. 7, 2004, the entire contents of which are hereby incorporated by reference as if fully set forth herein. Creation of a plan baseline for an SQL statement results in the execution plan generated by the first database system being used to execute the SQL statement in the second database system. Thus, creating plan baselines guarantees that execution plans will remain the same and will not be affected by system change. Additional recommendations may also be made by SPA. SPA can be used in this way to test many possible changes and gather empirical evidence for their advantages and disadvantages prior to choosing a single optimal one, without imposing any risk on database users. A new workload performance version may be created to test each of the series of changes.

Repeating Performance Analyses

According to one embodiment, SPA may be used repeatedly and iteratively to compare different database systems or different versions of a database system as the DBA makes further changes to the database systems. A history may be kept of past performance workload set versions, and comparisons may be performed and reports may be generated for any two performance workload set versions that have been saved in history. In this way, SPA may be used by a DBA to test many possible changes before the DBA chooses a final set of changes for implementation. Advantageously, this testing is performed by SPA without impact to the underlying database system on which SPA runs since SPA execution does not modify the data in the database of the underlying database system.

Executing SQL Statements on a Remote Database System

According to another embodiment, SPA may execute SQL statements on a remote database system. SPA may be first installed and invoked on a database system that can support SPA. Then, SPA may remotely execute SQL statements on another database system by creating a database link to the other database system and using the database link to execute an SQL statement and to retrieve execution plan and statistics for the execution of the SQL statement.

By using SPA's capability to execute SQL statements on a remote database system that does not itself include SPA functionality, a DBA may test the impact of changes to an older database system that is not capable of supporting SPA, without upgrading the older database system. The DBA may also take advantage of this capability to test the impact of an upgrade to an older database system.

Hardware Overview

Figure 2:
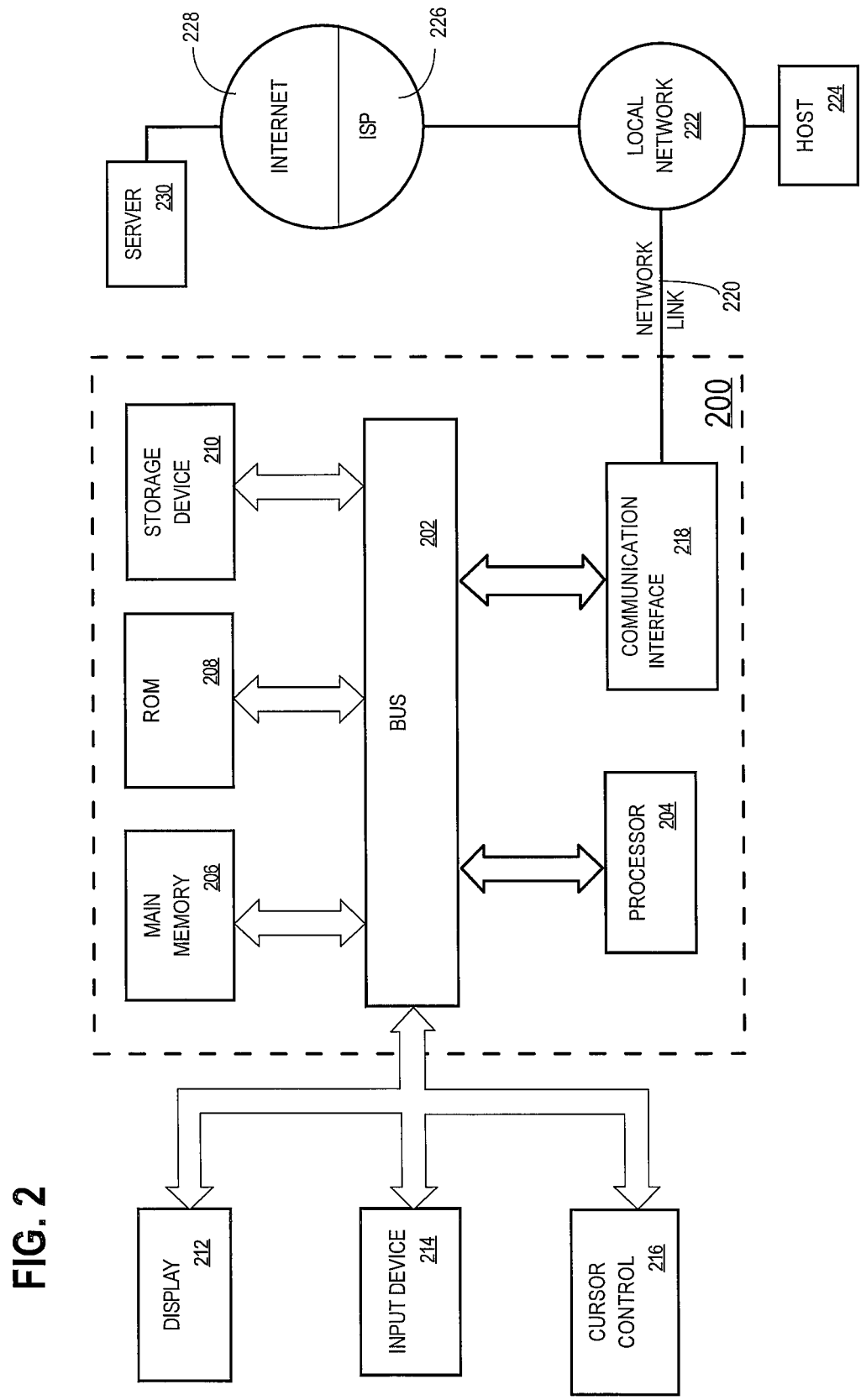
FIG. 2 is a diagram of a computer system that may be used in an implementation of an embodiment of the present invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to storage media and transmission media. Storage media includes both non-volatile media and volatile media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   selecting, from a workload set, a set of targeted database query language statements for performance analysis, wherein the workload set comprises database query language statements;
   executing, on a first database system, the set of targeted database query language statements;
      wherein executing the set of targeted database query language statements on the first database system comprises gathering a first set of performance data about the execution of each database query language statement of said targeted database query language statements on the first database system;
   executing, on a second database system, the set of targeted database query language statements, wherein the database of the second database system is a modified version of the database of the first database system;
      wherein executing the set of targeted database query language statements on the second database system comprises gathering a second set of performance data about the execution of said each database query language statement of said targeted database query language statements on the second database system;
   wherein each of the first set of performance data and second set of performance data comprises statistics based on at least one of the following:
      (a) CPU time consumed to execute said each database query language statement of said set of targeted database query language statements,
      (b) buffer reads incurred to execute said each database query language statement of said set of targeted database query language statements, and
      (c) disk reads incurred to execute said each database query language statement of said set of targeted database query language statements;
   comparing the first set of performance data with the second set of performance data; and
   generating information that indicates a result of the comparison,
      wherein the information that indicates a result of the comparison includes a difference in a total performance metric for executing the set of targeted database query language statements between the first database system and the second database system; and
      wherein the information that indicates a result of the comparison includes, for each database query language statement in the set of targeted database query language statements, a difference in a performance metric for executing said each database query language statement between the first database system and the second database system.

2. The computer-implemented method of claim 1, wherein the workload set is captured from a production database system.

3. The computer-implemented method of claim 2, wherein the workload set is captured by:
   capturing database query language statements that have been executed on the production database system over a period of time.

4. The computer-implemented method of claim 2, wherein the workload set is captured from at least one diagnostic trace of the production database system.

5. The computer-implemented method of claim 1, wherein the workload set further comprises execution context data for the database query language statements.

6. The computer-implemented method of claim 5, wherein the execution context data includes bind values and optimizer parameter values.

7. The computer-implemented method of claim 1, wherein the set of targeted database query language statements comprises database query language statements that originate from a specific application.

8. The computer-implemented method of claim 1, wherein the first set of performance data includes, for each database query language statement in the set of targeted database query language statements, a total execution time.

9. The computer-implemented method of claim 8, wherein the first set of performance data further includes, for each database query language statement in the set of targeted database query language statements, a CPU time and an I/O time.

10. The computer-implemented method of claim 1, wherein each database query language statement in the set of targeted database query language statements is executed on the first database system in isolation from other database query language statements in the set of targeted database query language statements.

11. The computer-implemented method of claim 1, wherein:
   executing the set of targeted query language statements comprises generating, for each database query language statement in the set of targeted database query language statements, an execution plan; and
   the first set of performance data includes, for the each database query language statement, an estimated cost based on the execution plan generated for the each database query language statement.

12. The computer-implemented method of claim 1, wherein executing the set of targeted query language statements on the first database system comprises executing the set of targeted query language statements in an order specified by a user.

13. The computer-implemented method of claim 1, wherein executing the set of targeted query language statements on the first database system is terminated if the execution reaches a pre-determined time limit.

14. The computer-implemented method of claim 1, wherein executing the set of targeted query language statements on the first database system does not modify any data stored in a database contained in the first database system.

15. The computer-implemented method of claim 11, wherein:
   the second set of performance data includes, for each database query language statement in the set of targeted database query language statements, an estimated cost based on an execution plan generated for the each database query language statement for execution on the second database system;
   the information that indicates a result of the comparison includes information that indicates, for each database query language statement in the set of targeted database query language statements, whether the execution plan generated for the each database query language statement for execution on the second database system differs from the execution plan generated for the each database query language statement for execution on the first database system.

16. The computer-implemented method of claim 1, further comprising:
generating a report that includes the information that indicates a result of the comparison.

17. The computer-implemented method of claim 16, wherein:
the report further includes a recommendation for a database query language statement in the set of targeted database query language statements whose performance in the second database system is worse than performance in the first database system;
the recommendation is to tune the database query language statement.

18. The computer-implemented method of claim 16, wherein:
the report further includes a recommendation for a database query language statement in the set of targeted database query language statements whose performance in the second database system is worse than performance in the first database system;
the recommendation is to create a plan baseline for the database query language statement;
the plan baseline is the execution plan for the database query language statement in the first database system; and
creation of the plan baseline for the database query language statement results in the plan baseline being used in executing the database query language statement in the second database system.

19. The computer-implemented method of claim 1, wherein the step of executing the set of targeted database query language statements on the first database system comprises executing the set of targeted database query language statements through a database link.

20. A computer-readable storage medium storing instructions, wherein the instructions include instructions which, when executed by one or more processors, cause the one or more processors to perform steps of:
selecting, from a workload set, a set of targeted database query language statements for performance analysis, wherein the workload set comprises database query language statements;
executing, on a first database system, the set of targeted database query language statements;
wherein executing the set of targeted database query language statements on the first database system comprises gathering a first set of performance data about the execution of each database query language statement of said targeted database query language statements on the first database system;
executing, on a second database system, the set of targeted database query language statements, wherein the database of the second database system is a modified version of the database of the first database system;
wherein executing the set of targeted database query language statements on the second database system comprises gathering a second set of performance data about the execution of said each database query language statement of said targeted database query language statements on the second database system;
wherein each of the first set of performance data and second set of performance data comprises statistics based on at least one of the following:
(a) CPU time consumed to execute said each database query language statement of said set of targeted database query language statements,
(b) buffer reads incurred to execute said each database query language statement of said set of targeted database query language statements, and
(c) disk reads incurred to execute said each database query language statement of said set of targeted database query language statements;
comparing the first set of performance data with the second set of performance data; and
generating information that indicates a result of the comparison,
wherein the information that indicates a result of the comparison includes a difference in a total performance metric for executing the set of targeted database query language statements between the first database system and the second database system; and
wherein the information that indicates a result of the comparison includes, for each database query language statement in the set of targeted database query language statements, a difference in a performance metric for executing said each database query language statement between the first database system and the second database system.

21. The computer-readable storage medium of claim 20, wherein the workload set is captured from a production database system.

22. The computer-readable storage medium of claim 21, wherein the workload set is captured by:
capturing database query language statements that have been executed on the production database system over a period of time.

23. The computer-readable storage medium of claim 21, wherein the workload set is captured from at least one diagnostic trace of the production database system.

24. The computer-readable storage medium of claim 20, wherein the workload set further comprises execution context data for the database query language statements.

25. The computer-readable storage medium of claim 24, wherein the execution context data includes bind values and optimizer parameter values.

26. The computer-readable storage medium of claim 20, wherein the set of targeted database query language statements comprises database query language statements that originate from a specific application.

27. The computer-readable storage medium of claim 20, wherein the first set of performance data includes, for each database query language statement in the set of targeted database query language statements, a total execution time.

28. The computer-readable storage medium of claim 27, wherein the first set of performance data further includes, for each database query language statement in the set of targeted database query language statements, a CPU time and an I/O time.

29. The computer-readable storage medium of claim 20, wherein each database query language statement in the set of targeted database query language statements is executed on the first database system in isolation from other database query language statements in the set of targeted database query language statements.

30. The computer-readable storage medium of claim 20, wherein:
the instructions for executing the set of targeted query language statements comprises instructions for generating, for each database query language statement in the set of targeted database query language statements, an execution plan; and
the first set of performance data includes, for the each database query language statement, an estimated cost based on the execution plan generated for the each database query language statement.

31. The computer-readable storage medium of claim 20, wherein executing the set of targeted query language statements on the first database system comprises executing the set of targeted query language statements in an order specified by a user.

32. The computer-readable storage medium of claim 20, wherein executing the set of targeted query language statements on the first database system is terminated if the execution reaches a pre-determined time limit.

33. The computer-readable storage medium of claim 20, wherein executing the set of targeted query language statements on the first database system does not modify any data stored in a database contained in the first database system.

34. The computer-readable storage medium of claim 30, wherein:
   the second set of performance data includes, for each database query language statement in the set of targeted database query language statements, an estimated cost based on an execution plan generated for the each database query language statement for execution on the second database system;
   the information that indicates a result of the comparison includes information that indicates, for each database query language statement in the set of targeted database query language statements, whether the execution plan generated for the each database query language statement for execution on the second database system differs from the execution plan generated for the each database query language statement for execution on the first database system.

35. The computer-readable storage medium of claim 20, further comprising:
   generating a report that includes the information that indicates a result of the comparison.

36. The computer-readable storage medium of claim 35, wherein:
   the report further includes a recommendation for a database query language statement in the set of targeted database query language statements whose performance in the second database system is worse than performance in the first database system;
   the recommendation is to tune the database query language statement.

37. The computer-readable storage medium of claim 35, wherein:
   the report further includes a recommendation for a database query language statement in the set of targeted database query language statements whose performance in the second database system is worse than performance in the first database system;
   the recommendation is to create a plan baseline for the database query language statement;
   the plan baseline is the execution plan for the database query language statement in the first database system; and
   creation of the plan baseline for the database query language statements results in the plan baseline being used in executing the database query language statement in the second database system.

38. The computer-readable storage medium of claim 20, wherein the step of executing the set of targeted database query language statements on the first database system comprises executing the set of targeted database query language statements through a database link.

* * * * *